June 10, 1947. W. F. WILSON 2,422,173
TRANSMISSION
Original Filed Jan. 12, 1944  2 Sheets-Sheet 2
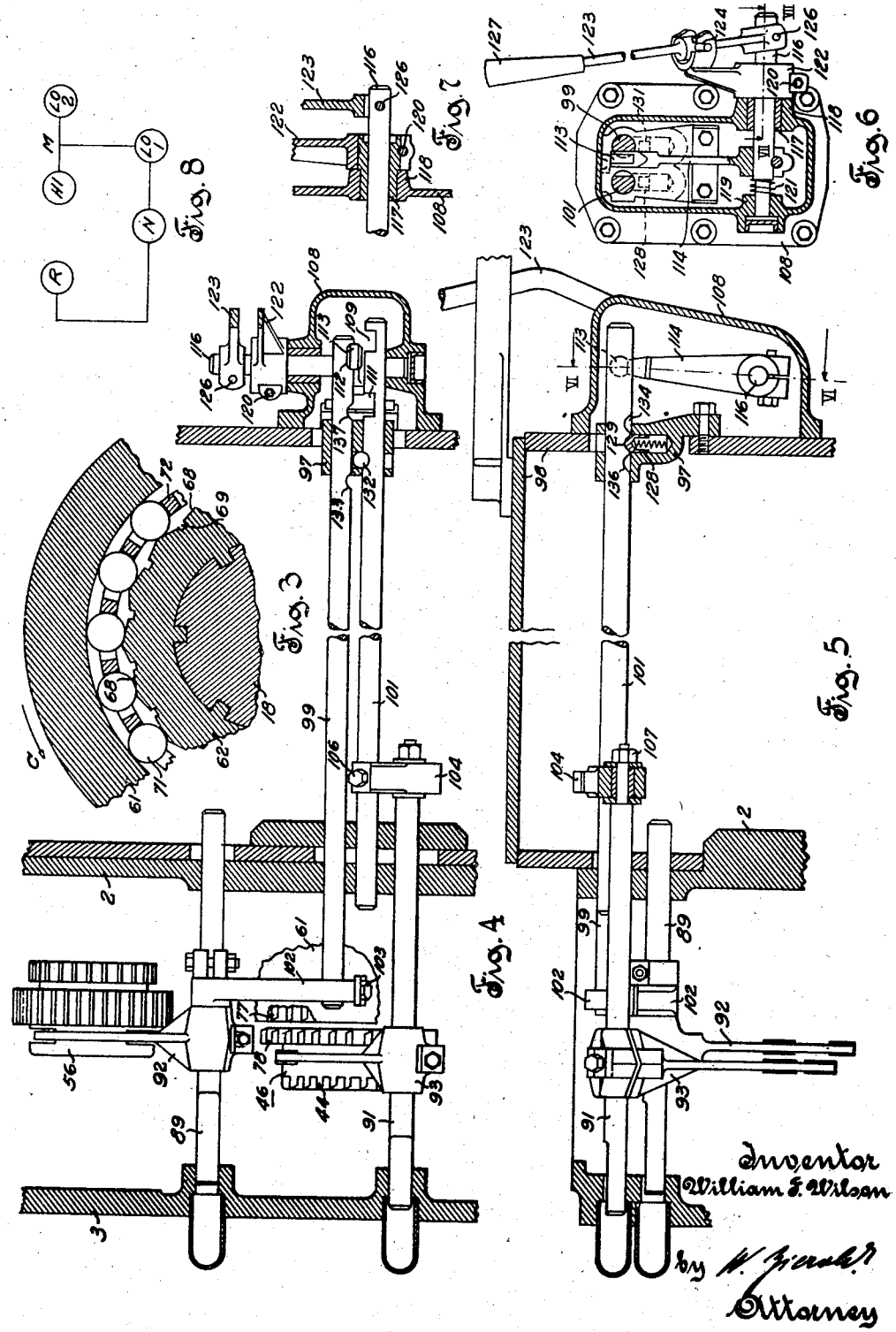
Inventor
William F. Wilson Patented June 10, 1947

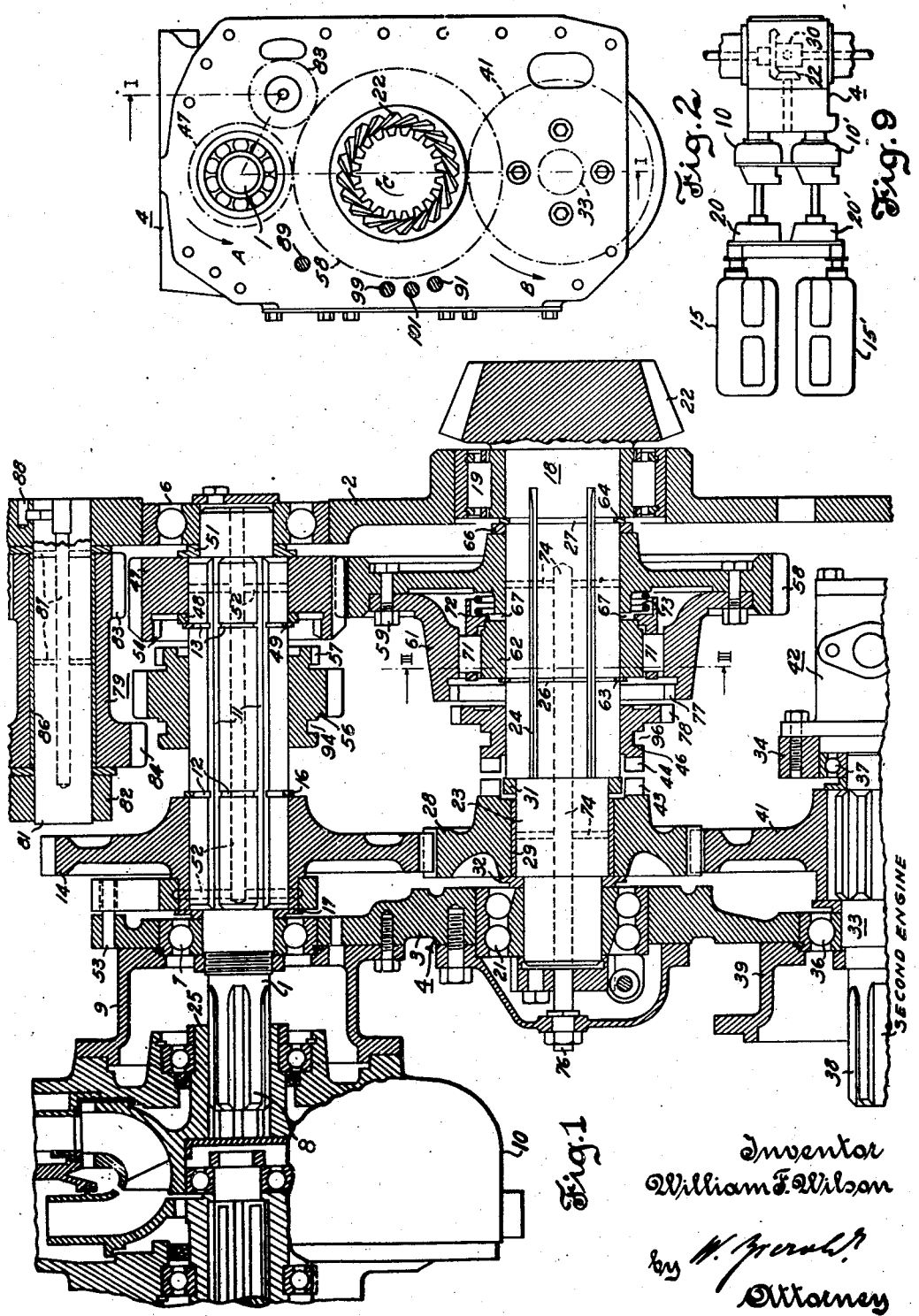

2,422,173

UNITED STATES PATENT OFFICE 2,422,173

TRANSMISSION

William F. Wilson, Wauwatosa, Wis., assignor to Allis-Chalmers Manufacturing Company, Milwaukee, Wis., a corporation of Delaware Original application January 12, 1944, Serial No. 517,941. Divided and this application March 23, 1945, Serial No. 584,315

8 Claims. (Cl. 74—359)

The invention relates to gearing for transmitting power from a power source to a load, and it is concerned more specifically with a change speed transmission which may be used, as for instance in an automotive vehicle, where it is desired to drive the load selectively through a gear train affording a relatively high speed ratio and through another gear train affording a relatively low speed ratio, and where it is further desired to change from the high speed ratio to the low speed ratio quickly and substantially without loss of torque. The present application is a division of application Serial No. 517,941, filed January 12, 1944, for Double engine transmission.

Transmissions of the type which permit a quick change from high to low speed ratio substantially without loss of torque have heretofore been suggested for use in automotive vehicles, and such earlier transmissions have usually been so constructed that the speed at which the driven shaft is rotated upon establishment of the high speed drive is equal to or lower than the speed at which the driving shaft is rotated by the vehicle engine. Under certain conditions, as when the transmission is to be used as an auxiliary transmission in connection with a hydraulic torque converter, it has been found desirable to provide a high speed drive which will afford a speed of the driven shaft higher than that at which the driving shaft is rotated by the power of the engine, and to provide a low speed drive which will afford a speed of the driven shaft lower than that at which the driving shaft is rotated by the power of the engine.

It is an object of the invention to provide a transmission in which a high speed gear train and a low speed gear train are so arranged as to satisfactorily take care of the mentioned special requirements, and in which the power flow may be diverted from the high speed gear train to the low speed gear train instantaneously and substantially without loss of torque.

A further object of the invention is to provide a transmission for the mentioned special requirements which, in addition to the high and low speed drives, will afford a suitably low reverse speed drive.

A further object of the invention is to provide a transmission of the mentioned character affording high, low and reverse speed drives, which will be simple and compact in construction, efficient in operation and which may be manufactured at relatively low costs.

Another object of the invention is to provide a transmission in which the power flow may be readily diverted from a high speed gear train to a low speed gear train affording relatively high and low speed ratios, respectively, and in which the gears affording the low speed ratio are so arranged that they will not become subject to excessive speeds when power is transmitted from the driving to the driven shaft through the high speed gear train, and particularly at a speed higher than that of the driving shaft.

Another object of the invention is to provide a transmission in which power may be transmitted from the driving to the driven shaft selectively through different gear combinations affording, respectively, a high speed drive and a low speed drive, and through a third gear combination affording another low speed drive preferably for reverse; in which at least one of the low speed drives will be established automatically and substantially without loss of torque upon interruption of the high speed drive; and in which the gears of both low speed drives are so arranged that they will not become subject to excessive speeds which would result in or tend to cause undue friction losses and where when the transmission is operated upon establishment of the high speed drive.

Another object of the invention is to provide a transmission of the mentioned character which is so constructed that it lends itself readily to use with either a single driving engine or several driving engines, and which will serve to transmit the combined driving power of several engines to the driven shaft selectively at the mentioned high speed ratio or through the mentioned low speed gear combinations.

A further object of the invention is to provide an improved arrangement for selectively establishing two low speed driving connections between the driving and driven shafts of a transmission, the improved arrangement having operating characteristics which will permit and favor its use in combination with a high speed gear train, particularly one affording an over-drive, and which will serve, when so used, to avoid excessive speeds of the low speed gears when the transmission is operated upon establishment of the high speed drive.

The foregoing and other objects and advantages of the invention will be more fully apparent from the following description of a preferred embodiment of the invention shown in the accompanying drawings. Referring to the drawings, in which like reference characters designate the same or similar parts in the various views:

Fig. 1 is a sectional top view of a transmission along line I—I of Fig. 2;

Fig. 2 is an end view, at a reduced scale, of the transmission shown in Fig. 1;

Fig. 3 is a fragmentary sectional view, at an enlarged scale, on line III—III of Fig. 1;

Fig. 4 is a sectional top view of a shift mechanism for the transmission shown in Fig. 1;

Fig. 5 is a sectional side view of the shift mechanism shown in Fig. 4;

Fig. 6 is a sectional end view of the shift mechanism shown in Fig. 4, taken on line VI—VI of Fig. 5;

Fig. 7 is a sectional detail view on line VII—VII of Fig. 6; and

Fig. 8 is a shift diagram for the mechanism shown in Figs. 4 to 6.

Fig. 9 is a diagrammatic view of a two engine installation incorporating the transmission shown in Fig. 1.

Referring to Fig. 1, a driving shaft 1 is journaled in front and rear walls 2 and 3 of a housing generally denoted by the reference character 4, a ball bearing 6 for supporting the front end of the shaft 1 being mounted in the front wall 2, and another ball bearing 7 for supporting the shaft 1 being mounted in the rear wall 3 of the housing. The driving shaft 1 extends rearwardly through the ball bearing 7 and has a splined portion 8 outside of the housing 4.

As indicated in Fig. 9, a hydraulic torque converter 10 is interposed between the transmission housing 4 and an internal combustion engine 15, and in conformity with the usual practice a master clutch 20 is interposed between the engine 15 and the hydraulic torque converter 10.

As shown in Fig. 1, the driving shaft 1 is alined with the tail shaft 25 of the torque converter 10 and the splined portion 8 of the driving shaft 1 extends into a hollow internally splined portion of the tail shaft 25, the external splines of the shaft portion 8 matching the internal splines of the tail shaft to provide a telescopically separable driving connection between the torque converter 10 and the driving shaft 1. An adapter 9 surrounding the rearwardly projecting portion 8 of the driving shaft 1 is bolted to the rear wall 3 of the transmission housing and is suitably flanged for connection with the housing of the torque converter 10.

The portion of the driving shaft 1 between the ball bearings 6 and 7 has a circumferential series of longitudinally extending splines 11, and two circumferential grooves 12 and 13 are cut into the splines 11. Non-rotatably connected with the driving shaft 1 between the groove 12 and the ball bearing 7 is a large diameter high speed gear 14, the hub of this gear having internal splines matching the splines 11, and the gear being retained in an axially fixed position on the shaft 1 by a snap ring 16 placed into the groove 12 and by a thrust washer 17 interposed between the inner race of the ball bearing 7 and the hub of the gear 14.

A shaft 18 which constitutes the driven shaft of the transmission is journaled in the housing 4 for rotation on an axis spaced transversely from and extending parallel to the axis of the driving shaft 1, a roller bearing 19 for supporting the driven shaft 18 being mounted in the front wall 2 of the housing, and a double row ball bearing 21 for supporting the rear end of the driven shaft being mounted in the rear wall 3 of the housing. Integrally formed with the driven shaft 18 at the forward end thereof outside of the housing 4 is a spiral bevel gear 22 for connecting the driven shaft to a load.

As shown in Fig. 9, the bevel gear 22 meshes with a spiral ring gear of a differential mechanism 30, it being understood that the transmission as shown in the drawings is intended for use in a tractor having forwardly located propelling gearing including the mentioned differential mechanism 30.

The driven shaft 18 has axially alined cylindrical and splined portions 23 and 24, respectively, between the bearings 19 and 21, the diameter of the cylindrical portion 23 being smaller than the outer diameter of the splined portion 24, and a pair of circumferential grooves 26 and 27 are cut into the splines of the portion 24.

Rotatably mounted on the cylindrical portion 23 of the driven shaft 18 is a small diameter high speed gear 28 having circumferential teeth in constant mesh with the teeth of the gear wheel 14. The hub of the gear 28 has an axial bore lined with a bushing 29, and the bushing has a running fit on the cylindrical shaft portion 23. A thrust ring 31 surrounds the cylindrical shaft portion at the junction of the splined shaft portion 24 with the cylindrical shaft portion and affords an abutment for limiting forward displacement of the gear 28 relative to the shaft 18. Rearward displacement of the gear 28 is limited by a thrust washer 32 interposed between the inner race of the ball bearing 21 and the hub of the gear 28.

The legend "Second engine" in Fig. 1 is applied to a shaft 33 to indicate that this shaft is to be connected with another driving engine 15' as shown in Fig. 9, and which, like the first driving engine 15, may be assumed to be of the internal combustion type. A stationary bearing bracket 34 is supported within the housing 4 between the front and rear walls 2 and 3, and ball bearings 36 and 37 mounted in the rear wall 3 and in the bracket 34, respectively, support the shaft 33 for rotation about an axis parallel to the axis of the driven shaft 18. The shaft 33 extends rearwardly through the ball bearing 36 and has a splined portion 38 outside of the housing 4 for connection with the second engine. The connection between the shaft 33 and the second engine 15' is an exact duplicate of the connection between the first engine 15 and the driving shaft 1, which has been generally outlined hereinbefore. That is, the shaft 33 is alined with the tail shaft of another torque converter 10' connected by means of a master clutch 20' with the second engine, and the splined portion 38 of the shaft 33 extends into a hollow internally splined portion of the tail shaft of the second torque converter 10', the external splines of the shaft portion 38 matching the internal splines of the tail shaft to provide a telescopically separable driving connection between the second mentioned torque converter and the shaft 33. An adapter 39 surrounding the rearwardly projecting portion 38 of the shaft 33 is bolted to the rear wall of the housing 4 and is suitably flanged for connection with the housing of the second mentioned torque converter.

Non-rotatably mounted on the shaft 33, between the ball bearings 36 and 37, is a gear wheel 41 having circumferential teeth in mesh with the teeth of the gear 28. A rotor pump generally designated by the reference character 42 represents auxiliary equipment which may be driven by the shaft 33, the pump being bolted to the bearing bracket 34 and having a driving connection with the shaft 33 at the forward end of the latter. The pump may be used, for instance, to circulate oil for the transmission, differential and torque converter through a cooler.

Referring again to the small diameter high speed gear 28, an annular series of axially extending clutch teeth 43 are formed on the hub of this gear at the side thereof facing the splined portion 24 of the driven shaft 18. Another annular series of clutch teeth 44 are formed on a clutch collar 46 which is non-rotatably connected with the driven shaft 18 and shiftable axially thereof, the clutch collar 46 having internal splines matching the external splines on the portion 24 of the driven shaft 18. The clutch teeth 44 are adapted to enter into the gaps between the clutch teeth 43 upon rearward movement of the clutch collar 46 from the position in which it is shown in Fig. 1, and the mentioned rearward movement of the clutch collar 46 will therefore couple the small diameter high speed gear 28 with the driven shaft 18 for rotation in unison therewith, and forward movement of the clutch collar 46 from its rearwardly shifted position into the position in which it is shown in Fig. 1 will uncouple the small diameter high speed gear 28 from the driven shaft 18 for rotation independently thereof. The clutch collar 46 constitutes a control member one function of which is to couple the small diameter high speed gear 28 to and uncouple it from the driven shaft 18, and which has another function as will appear hereinbelow.

Assuming that the shafts 1 and 33 are rotated by the first and second driving engines, respectively, in the same direction, as indicated by the arrows A and B in Fig. 2, it will be apparent that the gear 28 is then driven by both engines in the direction of arrow C shown in Fig. 2, and that upon engagement of the clutch teeth 44 with the clutch teeth 43 the combined driving power of both engines will be transmitted to the driven shaft 18. The pitch diameter of the gear 14 is the same as the pitch diameter of the gear 41 and substantially larger than the pitch diameter of the gear 28, and when the driving shafts 1 and 33 are driven by the first and second engines, respectively, or when power is applied to only one of the driving shafts by its respective engine while the other engine is idle, the high speed gear 28 will be rotated at a higher speed than that at which the driving shafts 1 and 33 rotate. Accordingly, when the gear 28 is coupled to the driven shaft 18 by means of the clutch collar 46 the driven shaft will also rotate at a higher speed than the driving shafts, and an over-drive is thus afforded which may serve to recoup the speed loss caused by the slip of the torque converters.

A low speed drive forward and a reverse speed drive are provided for by means of a forward and reverse drive mechanism for transmitting power from the driving shaft 1 to the driven shaft 18, and which is constructed as follows. Rotatively loose on the forward portion of the driving shaft 1 is a small diameter low speed gear 47, this gear having a smooth axial bore of such diameter as to provide a running fit between the cylindrical surface of the bore and the outer cylindrical surface portions of the splines 11. A thrust ring 48 abuts a snap ring 49 placed into the groove 13 of the shaft 1 to limit rearward axial displacement of the gear 47, and a thrust washer 51 is interposed between the gear 47 and the inner race of the ball bearing 6 to limit forward axial displacement of the gear 47. The shaft 1 has axial and radial bores 52 for the delivery of lubricant to the running surface of the gear 47 from an oil inlet 53 in the rear wall 3 of the housing 4. The rear face of the gear 47 is recessed and provided with an annular series of internal clutch teeth 54.

Non-rotatably mounted on the driving shaft 1 between the gears 14 and 47 is a combined gear and clutch element 56 which is movable axially of the shaft 1 in opposite directions from the position in which it is shown in Fig. 1. The gear and clutch element 56 has a splined axial bore matching the splines 11 of the shaft 1, and an annular series of clutch teeth 57 are formed on the element 56 at the side thereof facing the low speed gear 47. The clutch teeth 57 are adapted to enter into the gaps between the clutch teeth 54 upon forward movement of the gear and clutch element 56 from the position in which it is shown in Fig. 1, and such forward movement of the element 56 into clutching engagement with the low speed gear 47 will connect said gear with the driving shaft 1 for rotation in unison therewith.

The small diameter low speed gear 47 on the shaft 1 is in constant mesh with a large diameter low speed gear 58 which is rotatively loose on the driven shaft 18, and which will be referred to as a master gear. The hub of the gear 58 has a smooth axial bore of such diameter as to provide a running fit between the cylindrical surface of the bore and the outer surface of the splined portion 24 of the driven shaft 18.

Secured to the web of the master gear 58 by an annular series of bolts and nuts 59 is a flanged ring 61 which constitutes the driving member of an overrunning clutch between the master gear 58 and the driven shaft 18. A cam ring 62 constituting the driven member of the overrunning clutch is non-rotatably secured to the driven shaft 18 in rear of the master gear 58, the cam ring 62 having a splined axial bore matching the splines of the shaft portion 24, and a snap ring 63 is placed into the groove 26 of the splined shaft portion 24 to limit rearward axial displacement of the cam ring 62. Another snap ring 64 is placed into the groove 27 of the splined shaft portion 24, and a thrust ring 66 bearing against the snap ring 64 affords an abutment to limit forward axial displacement of the master gear 58 and cam ring 62. Rearward axial displacement of the master gear 58 is limited by contact of its hub with the front face of the cam ring 62, and a series of radial oil grooves 67 are cut into the rear face of the hub of gear 58.

Referring to Fig. 3, a circumferential series of flats 68 and axial grooves 69 are formed along the periphery of the cam ring 62, and the ring 61 has an internal cylindrical surface radially spaced from the periphery of the cam ring 62. Rotation of the ring 61 in the direction of arrow C in Figs. 2 and 3 is transmitted to the cam ring 62 through a series of rollers 71 arranged within the space between the ring 61 and the cam ring 62. The rollers are resiliently urged into the wedging position in which they are shown in Fig. 3, by a cage 72 and by a helical spring 73 which is shown in Fig. 1. The spring 73 is hooked at one end into a suitable portion of the cage 72 and at the other end into the cam ring 62. A more detailed description of the overrunning clutch comprising the driving and driven members 61 and 62, the rollers 71, cage 72 and spring 73 is believed unnecessary because its principles of operation are well known in the art.

The driven shaft 18 has axial and radial bores 74 for the delivery of lubricant from a supply pipe 76 to the running surfaces of the bushing 29 and of the master gear 58 on the shaft 18 and also to the radial oil grooves 67 of the master gear.

A lock-up clutch for the overrunning clutch 61, 62, 71 comprises an annular series of internal clutch teeth 77 which are formed on a skirt portion of the ring 61, and another annular series of clutch teeth 78 which are formed on the clutch collar 46 at the end thereof facing the ring 61. The clutch teeth 78 are adapted to enter into the gaps between the clutch teeth 77 upon forward movement of the clutch collar 46 from the position in which it is shown in Fig. 1, and such forward movement of the clutch collar 46 will lock the overrunning clutch. That is, upon movement of the clutch teeth 78 into clutching engagement with the teeth 77, the driven member of the overrunning clutch, which as stated is keyed to the shaft 18, will be prevented from overrunning the driving member 61 of the overrunning clutch. The clutch collar or control member 46 and the ring 61 form relatively engageable and disengageable members of the lock-up clutch, which are drivingly connected with the driven shaft 18 and with the master gear 58, respectively, and the control member 46 is shiftable axially of the driven shaft alternately into clutching engagement with the small diameter high speed gear 28 and with the master gear or large diameter low speed gear 58.

A reverse idler 79 is rotatably mounted on a stationary shaft 81 which is supported at its forward end within an opening of the front wall 2 of the transmission housing 4. The rear end of the shaft 81 is supported within a bracket portion 82 of the housing 4 intermediate the front and rear walls 2 and 3. Adjacent to the front wall 2 of the housing the reverse idler 79 has a gear section 83 in constant mesh with the master 58 on the driven shaft 18, the constant mesh relation between the gear section 83 of the reverse idler and the gear 58 being not indicated in Fig. 1 but shown in Fig. 2. Adjacent to the bracket portion 82 the reverse idler has another gear section 84 of such pitch diameter that the combined gear and clutch element 56 may be brought into mesh with the gear section 84 by rearward movement of the combined gear and clutch element from the position in which it is shown in Fig. 1. As stated hereinbefore, the combined gear and clutch element 56 has clutch teeth 57, and from the position in which the combined gear and clutch element is shown in Fig. 1, it may be shifted axially of the driving shaft 1 alternately into clutching engagement with the small diameter low speed gear 47 and into meshing engagement with the reverse idler 79, 84.

The axial bore of the reverse idler 79 is lined with a bushing 86, and the stationary shaft 81 has axial and radial bores 87 for the delivery of lubricant from an inlet 88 in the housing wall 2 to the running surfaces of the reverse idler.

When the clutch collar 46 and the combined gear and clutch element 56 are in the positions in which they are shown in Fig. 1, the transmission is in neutral, and movement of the clutch collar to the rear into clutching engagement with the gear 28 establishes the high speed drive, as has been explained hereinbefore. Assuming now that prior to the movement of the clutch collar 46 into clutching engagement with the small diameter high speed gear 28 the combined gear and clutch element 56 is moved into clutching engagement with the small diameter low speed gear 47, and that the master clutches are held disengaged until the clutch collar 46 is moved into engagement with the gear 28. Upon engagement of the master clutches the transmission will then operate in high, and the master gear 58 will be positively driven in the same direction as the gear 28 but at a lower speed than the shaft 18, and the driven member 62 of the overrunning clutch will overrun its driving member 61. It should be noted that the pitch diameter of the low speed gear 47 is substantially smaller than the pitch diameter of the high speed gear 14, and since the gears 14 and 47 rotate at the same speed, under the assumed conditions, it will be obvious that the driven shaft 18 rotates at a higher speed than the master gear 58.

A change from high to low gear may be effected by first disengaging the master clutches, then moving the clutch collar 46 from its rearmost position to its neutral position in which it is shown in Fig. 1, while the combined gear and clutch element 56 remains engaged with the low speed gear 47, and by then reengaging the master clutches. The driving power of the first engine will then be transmitted from the driving shaft 1 through the gears 47, 56, ring 61, rollers 71, and cam ring 62 to the driven shaft 18, and the driving power of the second engine will be transmitted from the shaft 33 through the gear 41, gear 28 and gear 14 to the driving shaft 1. The combined driving power of both engines will therefore be effective to rotate the driven shaft 18 at low speed. In actual practice, when the vehicle is moving in high gear, the clutch teeth 43 and 44 will bear upon each other circumferentially with more or less pressure, depending on the prevailing driving conditions. In order to change from high to low quickly and substantially without loss of torque, an operator may regulate the engines by means of the throttle so that the clutch teeth 43 and 44 will be subject to only a relatively light circumferential pressure upon each other, and while the clutch teeth 43, 44 are subject to such relatively light circumferential pressure upon each other and while the master clutches remain engaged the operator may move the clutch collar 46 forwardly by means of a hand lever, as described hereinbelow, to uncouple the high speed gear 28 from the driven shaft 18. In that case the relatively light power flow from the driving shafts to the driven shaft will be diverted instantaneously from the high speed gear train to the low speed gear train 47, 48 upon disengagement of the clutch teeth 44 from the clutch teeth 43.

If it is desired to retard the tractor by the braking power of the engines while the transmission is in low gear the overrunning clutch must be locked, that is, the cam ring 62 must be prevented from overrunning the ring 61 in the direction of arrow C in Fig. 3. This may be accomplished by moving the clutch collar 46 into clutching engagement with the ring 61 as has been explained hereinbefore. In his connection, however, the following should be noted. When the high speed driving connection is interrupted, as explained hereinbefore, by movement of the clutch collar 46 from its position of engagement with the gear 28 to the position in which it is shown in Fig. 1 the combined power of both engines is automatically shunted to the overrunning clutch, and the rollers 71 are wedged between the cam ring 62 and the ring 61 by the driving torque of the engine. The ring 61 and the cam ring 62 then rotate in unison, and the position of the ring 61 circumferentially of the shaft 1 may be such that the clutch teeth 78 do not register with the gaps beetween the clutch teeth 77, and as a result it would be impossible to move the clutch collar 46 from the position in which it is shown in Fig. 1 forwardly into clutching engagement with the ring 61 while forward driving torque is transmitted to the shaft 18 through the overrunning clutch. However, a reverse driving torque may be transmitted to the overrunning clutch upon establishment of the low speed drive, by decelerating the engines momentarily after the vehicle has been accelerated, and during the interval while the vehicle is coasting the clutch collar 46 may readily be moved forwardly into clutching engagement with the ring 61. To facilitate engagement of the clutch teeth 78 with the clutch teeth 77, the relatively adjacent ends of the clutch teeth 77 and 78 may be beveled as indicated in Fig. 4.

For reverse speed drive the combined clutch and gear element 56 is moved into mesh with the gear section 84 of the reverse idler 79, and the clutch collar 46 is moved into clutching engagement with the ring 61. These adjustments are made while the master clutches are disengaged, and upon engagement of the master clutches the driving power of the first engine will then be transmitted from the driving shaft 1 through gears 56, 84, 83, 58, and 61 and clutch collar 46 to the driven shaft 18, and the driving power of the second engine will be transmitted from the shaft 33 through gears 41, 28 and 14 to the driving shaft 1. The combined driving power of both engines will therefore be effective to rotate the driven shaft 18 in reverse.

The low speed gear 47 and the reverse idler 79 constitute auxiliary gears in constant mesh with the master gear 58, and power may be transmitted from the driving shaft 1 to the master gear 58 alternately through one or the other of said auxiliary gears by means of the combined gear and clutch element 56, as has been explained hereinbefore. The clutch teeth 54, 57 are operable to transmit power from the driving shaft 1 through the master gear 58 and through the one-way driving connection afforded by the overrunning clutch 61, 62, 71 to the driven shaft 18 to rotate the driven shaft forwardly at a relatively low speed ratio upon rotation of the driving shaft 1 in a predetermined direction, that is, in the direction in which it is rotated to drive the shaft 18 forwardly through the high speed gear train 14, 28. The gear teeth of the combined gear and clutch element 56 and the gear section 84 of the reverse idler are operable to transmit power from the driving shaft 1 through the reverse idler 79, master gear 58 and lock-up clutch 77, 78 to the driven shaft 18 to rotate the driven shaft reversely upon rotation of the driving shaft in said predetermined direction. More generally stated, the auxiliary gear 47, the clutch teeth 54 thereon and the clutch part of the combined gear and clutch element 56 represent primary power transmitting means operable to establish and interrupt a driving connection between the master gear 58 and the driving shaft 1, and the gear section 84 of the reverse idler and the gear part of the combined gear and clutch element 56 represent secondary power transmitting means operable to drivingly connect the reverse idler with and disconnect it from the driving shaft 1.

When the transmission is operated in high gear, the clutch teeth 43, 44 are engaged, as stated, and preferably the clutch teeth 54 and 57 are also engaged so that the low speed gear train will pick up the load immediately upon interruption of the high speed drive. The speed at which the driven shaft 18 rotates when the transmission is operated in high gear is substantially higher than the speed at which the driving shaft 1 is rotated by the power of the engines. The master gear 58, however, while drivingly connected with the driving shaft 1 due to the engagement of the clutch teeth 54, 57, rotates at a much lower speed than that at which the driven shaft 18 rotates during high speed drive, and the reverse idler 79 also rotates at a relatively low speed during high speed drive. The gear 47 and the combined gear and clutch element 56 which are preferably clutched together during high speed drive, as stated, also rotate at a speed lower than that at which the driven shaft 18 rotates during high speed drive, and the transmission may therefore be operated at relatively high speeds in high gear without subjecting any gears to excessive speeds which would result in or tend to cause undue friction losses and wear.

Referring to Figs. 2 and 4 to 7, the mechanism for shifting the clutch collar 46 and the combined gear and clutch element 56 is constructed as follows: Two shift rods 89 and 91 are slidably mounted in the upper part of the housing 4, the shift rod 89 having rigidly secured thereto a shift fork 92, and the rod 91 having rigidly secured thereto a shift fork 93. The pronged end of the shift fork 92 embraces the hub of the combined gear and clutch element 56, a groove 94 (Fig. 1) for the reception of the prongs of fork 92 being turned into the hub of the element 56 in conformity with usual practice. The pronged end of the fork 93 projects into a circumferential groove 96 (Fig. 1) of the clutch collar 46 between the clutch teeth 44 and 78. A bracket 97 is mounted in front of the housing 4 on a support 98 connected with the housing wall 2, and a pair of selector rods 99 and 101 are slidably supported in openings of the housing wall 2 and in the bracket 97. The selector rod 99 is connected with the shift rod 89 by an arm 102 secured to the shift rod 89 and having an aperture for the reception of the rear end of the selector rod 99. A screw 103 retains the selector rod 99 against axial displacement relative to the arm 102. The selector rod 101 is connected with the shift rod 91 by an arm 104 secured by a screw 106 to the selector rod 101 and having a bore receiving the reduced forward end of the shift rod 91. A nut 107 is threaded upon the forward end of the shift rod 91 to secure the arm 104 against displacement axially of the shift rod 91.

The selector rods 99 and 101 extend forwardly through the bracket 97 into a cap housing 108 mounted on the support 98, and the forward end of the selector rod 101 has notches 109 and 111 (Fig. 4) facing the selector rod 99. The selector rod 99 has a similar notch 112 facing the selector rod 101. As shown in Figs. 4, 5 and 6 the notch 112 accommodates the disk head 113 of an actuating arm 114 which is rigidly secured to a shaft 116 journaled in the lower part of the cap housing 108. The shaft 116 extends through a bushing 117 (Fig. 7) press-fitted into a bearing boss 118 at one side of the cap housing 108, and a reduced end portion of the shaft 116 (Fig. 6) is journaled in another bearing boss 119 at the opposite side of the housing 108. A coil spring 121 surrounding the reduced end portion of the shaft 116 bears against the bearing boss 119 and against a shoulder on the shaft 116, to urge the shaft 116 towards the right in Fig. 6. The tendency of the shaft 116 to move towards the right under the pressure of spring 121 is communicated to the arm 114 and disk head 113, and engagement of the disk head with the selector rod 99 limits the movement of the shaft 116 under the pressure of spring 121.

Rotatably mounted on the bushing 117 and retained thereon against axial displacement by a bolt 120 is a bracket arm 122, and a hand lever 123 is mounted on a head of the bracket arm 122 for pivotal movement about an axis extending at right angles to the axis of shaft 116. The hand lever 123 has alined trunnions 124, one of which is shown in Fig. 6, and the trunnions are seated in open-ended bearing notches in the head of the bracket arm 122. A forked portion at the lower end of the hand lever 123 straddles the outer end of the shaft 116 and is swingably connected therewith by a pivot pin 126. At its upper end the hand lever 123 has a handle 127, and by taking hold of this handle the operator obtains control of the shaft 116 and actuating arm 114, fore and aft movement of the handle 127 being effective to rock the shaft 116 about its axis and movement of the handle 127 towards the right in Fig. 6 being effective to move the shaft 116 to the left against the pressure of the spring 121.

The position in which the shift mechanism is shown in Figs. 4 to 6 corresponds to the neutral position of the transmission shown in Fig. 1. As shown in Fig. 5, a spring pressed plunger 128 within the bracket 97 engages a notch 129 in the selector rod 101, and as indicated in Fig. 6, another spring pressed plunger 131 similarly engages a notch in the selector rod 99. An interlock ball 132 within the bracket 97 is seated in a notch of the selector rod 101 and bears against the selector rod 99, so that the selector rod 101 cannot be moved from the position in which it is shown in Figs. 4 and 5. Accordingly, the clutch collar 46 is positively retained in the position in which it is shown in Fig. 1, while the shift mechanism is in neutral.

In the shift diagram shown in Fig. 8 the position occupied by the handle 127 when the transmission is in neutral is indicated at N, and from that position the handle 127 may be moved straight forward to the position indicated at LO—1. The result of such movement is that the selector rod 99 is moved to the right in Fig. 4 a sufficient distance to bring the notch 112 opposite to the notch 109, and to bring another notch 133 in the selector rod 99 opposite to the interlock ball 132. Further, the combined gear and clutch element 56 is moved into clutching engagement with the small diameter low speed gear 47 by the mentioned movement of the handle 127 from the position N to the position LO—1. The transmission is now in condition for forward drive in low gear and the overrunning clutch is unlocked. When the selector rod 99 arrives in the position corresponding to the position LO—1 of the handle 127 the spring pressed plunger 131 (Fig. 6) drops into a notch of the selector bar 99 to retain it in that position.

From the position LO—1 the handle 127 may be moved to the position indicated at HI, such movement first causing axial movement of the shaft 116 against the pressure of spring 121 and then rocking movement of the shaft 116 about its axis. As a result of the axial movement of shaft 116 the disk head 113 of the arm 114 moves from the notch 112 into the notch 109, and as a result of the rocking movement of the shaft 116 the clutch collar 46 moves into clutching engagement with the small diameter high speed gear 28. The transmission is then in condition for high speed drive forward. The movement of the selector rod 101 to engage the clutch collar 46 with the gear 28 upon engagement of the combined gear clutch element 56 with the small diameter low speed gear 47 is not obstructed by the interlock ball 132 because the latter is free to enter into the registering notch 133, and when the selector rod 101 is moved in the mentioned direction the interlock ball 132 rides on the full diameter portion of the selector rod 101 and locks the selector rod 99. As a result, the combined gear and clutch element 56 is positively retained in clutching engagement with the low speed gear 47 when the transmission is in high gear. When the selector rod 101 arrives in the position corresponding to the position HI of the handle 127 the spring pressed plunger 128 drops into a notch 134 of the selector rod 101 to retain it in that position.

From the position HI the handle 127 may be moved to the position LO—2, the first part of such movement disengaging the clutch collar 46 from the high speed gear 28 and the second part of this movement engaging the clutch collar 46 with the ring 61 of the overrunning clutch. As explained hereinbefore, the combined gear and clutch element 56 is in clutching engagement with the low speed gear 47 when the handle 127 is at HI, and the first part of the movement of the handle 127 from the position HI towards the position LO—2 in effect places the transmission in low gear, the driving power of both engines being immediately shunted to the overrunning clutch upon disengagement of the clutch collar 46 from the high speed gear 28. The last part of the movement of the handle 127 towards the position LO—2 locks the overrunning clutch. Movement of the handle 127 from the position HI towards the position LO—2 forces the spring pressed plunger 128 out of the notch 134 of the selector rod 101, and when the handle 127 reaches the middle point M in Fig. 8 the plunger 128 drops into the notch 129. Before proceeding from the point M toward the position LO—2 the operator may accelerate the vehicle and then momentarily decelerate the engines for the purpose explained hereinbefore. When the selector rod 101 arrives in the position corresponding to position LO—2 of the handle 127 the plunger 128 drops into a notch 136 of the selector rod 101 to retain it in said position.

From the position N in Fig. 8 the handle 127 may be moved to the position R in order to establish the reverse speed drive, the movement from N to R first causing rocking movement of the shaft 116 in one direction, then axial movement against the pressure of spring 121 and finally another rocking movement of the shaft 116 in the opposite direction. The first rocking movement of the shaft 116 moves the combined gear and clutch element 56 into mesh with the gear section 84 of the reverse idler 79, and also brings the notch 112 of the selector rod 99 opposite to the notch 111 of the selector rod 101. Further, the mentioned first rocking movement of the shaft 116 brings a notch 137 in the selector rod 99 opposite to the interlock ball 132 whereby the selector rod 101 is released for shifting movement. The selector rod 99 has another notch (not shown) into which the spring pressed plunger 131 (Fig. 6) may enter to retain the selector rod in the position to which it is moved by the first mentioned rocking movement of the shaft 116.

The axial movement of the shaft 116 during shift from neutral to reverse brings the disk head 113 of the actuating arm 114 from the notch 112 into the notch 111, and the final rocking movement of the shaft 116 during the last part of the shift brings the clutch collar 46 into clutching engagement with the driving member 61 of the overrunning clutch. The plunger 128 is forced out of the notch 129 and enters the notch 136 when the selector rod 101 is moved to lock the overrunning clutch upon meshing engagement of the combined gear and clutch element 56 with the reverse idler 79.

It will be noted that the shift mechanism shown in Figs. 4 to 7 is operable to move the clutch collar or control member 46 either to its rearwardly shifted position in which it engages the high speed gear 28, or to its forwardly shifted position in which it locks the overrunning clutch, upon movement of the combined gear and clutch element 56 to its forward drive establishing position, and that the shift mechanism is also operable to move the control member 46 to its forwardly shifted position in which it locks the overrunning clutch, upon movement of the combined gear and clutch element 56 to its reverse drive establishing position.

While in the foregoing a preferred embodiment of the invention has been disclosed it should be understood that it is not intended to limit the invention to the exact details of construction herein shown and described for various modifications within the scope of the appended claims may occur to persons skilled in the art.

It is claimed and desired to secure by Letters Patent:

1. In a change speed transmission, driving and driven shafts rotatable, respectively, on relatively spaced axes, a relatively large diameter high speed gear non-rotatably secured to said driving shaft, a relatively small diameter high speed gear rotatively loose on said driven shaft and in contact mesh with said large diameter gear, relatively small and large diameter low speed gears rotatively loose, respectively, on said driving and driven shafts and in constant mesh with each other, a reverse idler in constant mesh with said large diameter low speed gear, a combined gear and clutch element non-rotatably connected with said driving shaft and shiftable axially thereof alternately into clutching engagement with said small diameter low speed gear and into meshing engagement with said idler, an overrunning clutch operatively interposed between said large diameter low speed gear and said driven shaft and effective to connect said driven shaft with said large diameter low speed gear for rotation in unison therewith upon transmission of power from said driving shaft to said large diameter low speed gear through said small diameter low speed gear, and a control element non-rotatably connected with said driven shaft and shiftable axially thereof alternately into clutching engagement with said small diameter high speed gear and with said large diameter low speed gear.

2. A change speed transmission for applying power from a driving engine to a load, comprising a shaft connected in driven relation to said engine and constituting the driving shaft of said transmission, another shaft spaced transversely from said driving shaft and connected in driving relation to said load and constituting the driven shaft of said transmission, a driving gear non-rotatably secured to said driving shaft, a driven gear rotatively loose on said driven shaft and in constant mesh with said driving gear, a master gear and an auxiliary gear rotatively loose on said driven and driving shafts, respectively, and in constant mesh with each other, a reverse idler in constant mesh with said master gear, a combined gear and clutch element non-rotatably connected with said driving shaft and shiftable axially thereof alternately into clutching engagement with said auxiliary gear and into meshing engagement with said idler, an overrunning clutch operatively interposed between said master gear and said driven shaft, and a control element non-rotatably connected with said driven shaft and shiftable axially thereof alternately into clutching engagement with said driven gear and with said master gear.

3. In a change speed transmission, rotatable driving and driven shafts, high speed driving means operable to establish and interrupt a driving connection between said shafts and effective, upon rotation of said driving shaft in a predetermined direction and establishment of said driving connection, to rotate said driven shaft forwardly at a relatively high speed ratio, and low and reverse speed driving means comprising a master gear rotatable independently of said driven shaft, one-way driving means operatively interposed between said master gear and said driven shaft, means operable to transmit power from said driving shaft through said master gear and through said one-way driving means to said driven shaft, and effective to rotate said driven shaft forwardly at a relatively low speed ratio upon rotation of said driving shaft in said predetermined direction, a reverse idler connected in permanent operative relation to said master gear, a lock-up clutch having relatively engageable and disengageable members drivingly connected with said master gear and with said driven shaft, respectively, and means operable to transmit power from said driving shaft through said reverse idler, master gear and lock-up clutch to said driven shaft to rotate said driven shaft reversely upon rotation of said driving shaft in said predetermined direction.

4. In a change speed transmission, driving and driven shafts rotatable, respectively, on relatively spaced axes, a relatively large diameter high speed gear coaxial with said driving shaft, a relatively small diameter high speed gear coaxial with said driven shaft and in constant mesh with said large diameter gear, one of said high speed gears being non-rotatably secured to its respective shaft and the other being rotatively loose on its respective shaft, control clutch means for coupling said loose high speed gear to and uncoupling it from its respective shaft, a master gear rotatively loose on said driven shaft, means including an overrunning clutch for transmitting power from said master gear to said driven shaft, a first auxiliary gear rotatively loose on said driving shaft and in constant mesh with said master gear, a second auxiliary gear in constant mesh with said master gear, and means operable to alternately transmit power from said driving shaft through one or the other of said auxiliary gears to said master gear to rotate said master gear at a speed ratio lower than the speed ratio at which said driven shaft is rotatable by said high speed gears.

5. In a change speed transmission, driving and driven shafts, means operable to establish and interrupt a driving connection between said shafts and effective upon establishment of said driving connection to transmit power from said driving to said driven shaft at a relatively high speed ratio, and low speed driving means comprising a master gear rotatable independently of said driven shaft, means including an overrunning clutch for transmitting power from said master gear to said driven shaft, two auxiliary gears rotatable independently of said driving shaft and connected in permanent operative relation to said master gear, and means operable to alternately connect one or the other of said auxiliary gears in driven relation with said driving shaft.

6. A change speed transmission for applying power from a driving engine to a load, comprising a shaft connected in driven relation to said engine and constituting the driving shaft of said transmission, another shaft spaced transversely from said driving shaft and connected in driving relation to said load and constituting the driven shaft of said transmission, a master gear mounted on said driven shaft for rotation independently thereof, an auxiliary gear mounted on said driving shaft for rotation independently thereof and in constant mesh with said master gear, a reverse idler in constant mesh with said master gear, a combined gear and clutch element non-rotatably mounted on said driving shaft and shiftable axially thereof alternately into clutching engagement with said auxiliary gear and into meshing engagement with said reverse idler, an overrunning clutch operatively interposed between said master gear and said driven shaft, and a lock-up clutch having relatively engageable and disengageable members drivingly connected with said driven shaft and with said master gear, respectively.

7. A change speed transmission for applying power from a driving engine to a load, comprising a shaft connected in driven relation to said engine and constituting the driving shaft of said transmission, a forwardly and reversely rotatable shaft connected in driving relation to said load and constituting the driven shaft of said transmission, a master gear rotatable independently of said driven shaft, one-way driving means operatively interposed between said master gear and said driven shaft, primary power transmitting means operable to establish and interrupt a driving connection between said master gear and said driving shaft, said primary power transmitting means, upon establishment of said driving connection, and said one-way driving means being operative upon rotation of said driving shaft in a predetermined direction, to transmit power from said driving to said driven shaft to rotate said driven shaft forwardly, a reverse idler connected in permanent operative relation to said master gear, secondary power transmitting means operable to drivingly connect said reverse idler with and disconnect it from said driving shaft, and a lock-up clutch having relatively engageable and disengageable members drivingly connected with said driven shaft and with said master gear, respectively, said secondary power transmitting means being operative to transmit power from said driving shaft, through said master gear and said lock-up clutch when engaged, to rotate said driven shaft reversely upon rotation of said driving shaft in said predetermined direction.

8. A change speed transmission for applying power from a driving engine to a load, comprising a shaft connected in driven relation to said engine and constituting the driving shaft of said transmission, a forwardly and reversely rotatable shaft connected in driving relation to said load and constituting the driven shaft of said transmission, a master gear rotatable independently of one of said shafts, one-way driving means operatively interposed between said master gear and said one shaft, primary power transmitting means for connecting said master gear in operative relation to the other of said shafts, said master gear, one-way driving means and primary power transmitting means being operative upon rotation of said driving shaft in a predetermined direction to transmit driving power from said driving to said driven shaft to rotate said driven shaft forwardly, a reverse idler connected in permanent operative relation to said master gear, secondary power transmitting means operable to establish and interrupt a driving connection between said driving shaft and said reverse idler, and a lock-up clutch having relatively engageable and disengageable members drivingly connected, respectively, with said one shaft and with said master gear, said secondary power transmitting means being operative to transmit power from said driving shaft, through said master gear and said lock-up clutch when engaged, to rotate said driven shaft reversely upon rotation of said driving shaft in said predetermined direction.

WILLIAM F. WILSON.

REFERENCES CITED

The following references are of record in the file of this patent:

UNITED STATES PATENTS

| Number | Name | Date |
|---|---|---|
| 1,756,917 | Tenney | Apr. 29, 1930 |
| 1,759,558 | Jacobs | May 20, 1930 |
| 1,581,988 | Smalley | Apr. 20, 1926 |
| 2,042,235 | Misiak | May 26, 1936 |
| 1,166,656 | Brimson | Jan. 4, 1916 |

Certificate of Correction

Patent No. 2,422,173. June 10, 1947.

WILLIAM F. WILSON

It is hereby certified that error appears in the printed specification of the above numbered patent requiring correction as follows: Column 13, lines 39 and 40, claim 1, for "contact" read *constant*; and that the said Letters Patent should be read with this correction therein that the same may conform to the record of the case in the Patent Office.

Signed and sealed this 5th day of August, A. D. 1947.

[SEAL]

LESLIE FRAZER,
*First Assistant Commissioner of Patents.*